United States Patent [19]

Schmutz et al.

[11] 3,726,977
[45] Apr. 10, 1973

[54] 2-NITRO-11-(1-PIPERAZINYL)-DIBENZ (B,F) (1,4) OXAZEPINES COMPOSITIONS IN THE TREATMENT OF DEPRESSION

[75] Inventors: Jean Schmutz, Muri; Fritz Hunziker; Franz Martin Kunzle, both of Berne, all of Switzerland

[73] Assignee: Sandoz-Wander, Inc., Hanover, N.J.

[22] Filed: Nov. 1, 1971

[21] Appl. No.: 194,515

Related U.S. Application Data

[63] Continuation-in-part of Ser. No. 57,316, July 22, 1970, which is a continuation-in-part of Ser. No. 797,281, Feb. 6, 1969, Pat. No. 3,546,226, which is a continuation-in-part of Ser. Nos. 371,123, May 28, 1964, abandoned, and Ser. No. 712,956, March 14, 1968, abandoned.

[52] U.S. Cl.................................................424/250

[51] Int. Cl..............................................A61k 27/00
[58] Field of Search......................................424/250

[56] References Cited

UNITED STATES PATENTS 3,458,516   7/1969   Howell et al. ...................424/250

OTHER PUBLICATIONS

Conn–Current Therapy (1970) p. 671–677.

*Primary Examiner*—Stanley J. Friedman
*Attorney*—Gerald D. Sharkin et al.

[57] ABSTRACT

Pharmaceutical compositions containing 2-nitro-11-(1-piperazinyl)-dibenz [b,f] [1,4] oxazepine or its pharmaceutically acceptable acid addition salts are useful in the treatment of depression.

3 Claims, No Drawings

2-NITRO-11-(1-PIPERAZINYL)-DIBENZ (B,F) (1,4) OXAZEPINES COMPOSITIONS IN THE TREATMENT OF DEPRESSION

This application is a continuation-in-part of our pending application Ser. No. 57,316, filed July 22, 1970 which in turn is a continuation-in-part of application Ser. No. 797,281, filed Feb. 6, 1969, which issued as U.S. Pat. No. 3,546,226 on Dec. 8, 1970 which in turn is a continuation-in-part of our earlier applications Ser. No. 371,123, filed May 28, 1964 now abandoned, and Ser. No. 712,956, filed Mar. 14, 1968, now abandoned.

This invention is generally concerned with new heterocyclic compounds, and more specifically with 2-nitro-11-(1-piperazinyl)-dibenz [b,f] [1,4] oxazepine of the formula:

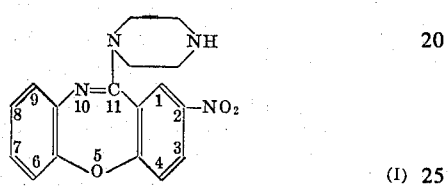

(I)

and pharmaceutically acceptable acid addition salts thereof. 2-Nitro-11-(1-piperazinyl)-dibenz[b,f] [1,4] oxazepine is obtained when a compound of the formula:

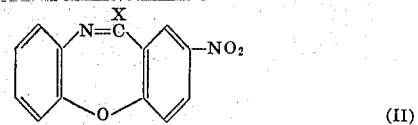

(II)

wherein X denotes a residue capable of being split off with the hydrogen of amines, is reacted with piperazine.

A residue capable of being split off with the hydrogen of amines, which can be bound ionically or covalently to the carbon atom, can most conveniently be represented by halogen, sulphydril, or alkoxy and alkylthio which may be activated, e.g. methoxy, thiomethyl or p-nitrobenzylthio, or by tosyl.

Starting materials of the formula II are obtained by converting the lactum of the formula:

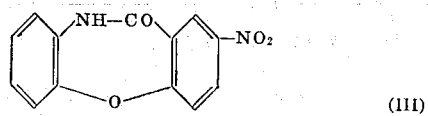

(III)

into the thiolactam which may be followed by alkylation, or by reaction of the lactam with a halogenating agent such as phosphorus oxychloride or phosphorus pentachloride, most suitably in the presence of a catalytic amount of dimethylaniline or dimethylformamide. The lactam of formula III is itself obtained by ring closure of a compound of the formula:

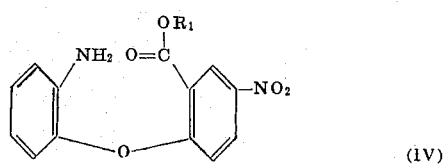

(IV)

wherein $R_1$ denotes hydrogen or lower alkyl. The lactam of formula III may also be obtained by ring closure of a compound of the formula:

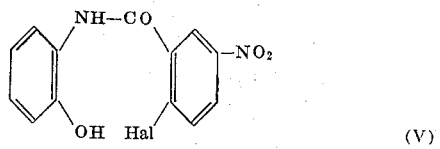

(V)

wherein Hal stands for halogen, or of a isocyanate of the formula:

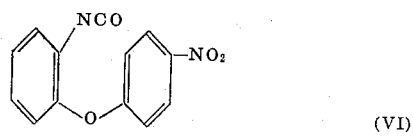

(VI)

2-Nitro-11-(1-piperazinyl)-dibenz[b,f][1,4]oxazepine is further obtained by ring closure through intramolecular condensation of an acid amide or acid thioamide of the formula:

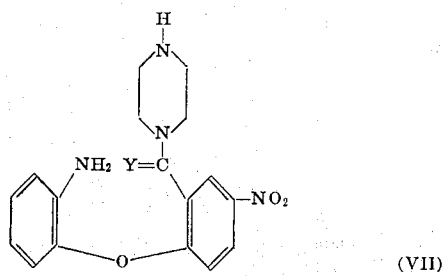

(VII)

wherein Y represents oxygen or sulphur. A purely thermal condensation rarely succeeds with the acid amide but rather with the thioamide which is, for example, obtained from the acid amide by treatment with phosphorus pentasulphide and need not be isolated before the following condensation. Especially in the case of the acid amide it is desirable to perform the ring closure in the presence of condensing agents, such as phosphorus pentachloride, phosphorus oxychloride, phosgene, polyphosphoric acid, and the like. It is assumed that the ring closure proceeds by way of intermediate steps such as imidochlorides, amidochlorides, imidophosphates, amidophosphates or salt-like derivatives thereof, which, in general, are not isolatable. The condensation of the thioamide is favoured by the presence of mercury(II) salts or by intermediate formation of imidothioethers which may be activated. Heating and, if required, the use of a suitable inert solvent are desirable, and when using phosphorus oxychloride and phosphorus pentachloride addition of catalytic amounts of dimethylformamide or dimethylaniline.

2-Nitro-11-(1-piperazinyl)-dibenz[b,f][1,4]oxazepine is also obtained by dehydration of an urea derivative of the formula:

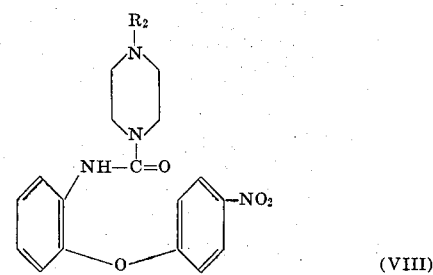

(VIII)

wherein $R_2$ means hydrogen or denotes a removable group, especially a hydrolytically removable group. The ring closure is preferably carried out by heating in the presence of dehydrating agents such as zinc chloride, aluminium chloride, stannic chloride, phosphoric acid, polyphosphoric acid and the like, especially phosphorus oxychloride or phosphorus oxychloride and phosphorus pentoxide, if desired in an inert solvent of suitable boiling point such as benzene or toluene etc. According to the chosen reaction conditions the starting material of formula VIII with a hydrolytically removed group $R_2$, e.g. carbalkoxy, especially carbethoxy, is cyclized directly to 2-nitro-11-(1—piperazinyl) compound by hydrolysis of the removable group. Other removable groups can be split off after ring closure in a way known per se, e.g. by hydrogenolysis.

2-Nitro-11-(1-piperazinyl)-dibenz[b,f][1,4] oxazepine obtained in this manner is crystallizable and reacts with inorganic and organic acids such as hydrochloric acid, hydrobromic acid, sulphuric acid, nitric acid, phosphoric acid, acetic acid, oxalic acid, maleic acid, succinic acid, tartaric acid, toluene sulphonic acid and the like to form addition salts which are stable in water, in which form the product may also be used.

Analogous dibenz[b,f][1,4] oxazepines are described in U.S. Pat. specification No. 3,458,516 whose scope includes also the 2-nitro-11-(1-piperazinyl)-dibenz[b,f][1,4] oxazepine of the present invention. These compounds, especially those having a nitro substituent in a benzene nucleus show the typical pharmacological effects of neuroleptics, which are seen e.g. in a reduction of the locomotor activity of the test animals.

It has been surprisingly found that the 2-nitro-11-(1-piperazinyl)-dibenz[b,f][1,4] oxazepine and its acid addition salts of the present invention show besides a relatively strong reduction of the locomotor activity, an extremely intense tetrabenazine antagonising effect, which, according to Stille et. al., Arzneimittelforschung 14, 534 ff (1964), is an indication for an anti-depressant action. Such an antidepressive activity has not been observed for any of the other compounds according to U.S. Pat. specification No. 3,458,516.

The 2-nitro-11-(1-piperazinyl)-dibenz[b,f][1,4] oxazepine has in mice an ED 50 in the locomotor activity test [method of Caviezel and Baillod; pharmac. Acta Helv. 33,469 (1958) of 2.4 mg/kg p.o.. The Ed 50 in the anti-tetrabenazine-test in rats (method of Stille; loc. cit.) is, for the catalepsy 15.0 mg/kg i.p. and for the ptosis 7.2 mg/kg i.p.. The median lethal dose LD 50 in mice is 147 mg/kg p.o..

For use in the treatment of depression the compounds of this invention may be administered orally or parenterally as such or admixed with conventional pharmaceutical carriers. They may be administered orally in such forms as tablets, dispersible powders, granules, capsules, syrups and elixirs, and parenterally as solutions, suspensions, dispersions, emulsions, and the like, e.g., a sterile injectable aqueous suspension. The compositions for oral use may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluents, such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and absorption in the gastrointestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monoleate) and preservatives (ethyl-p-hydroxybenzoate). Capsules may contain the active ingredient alone or admixed with an inert solid diluent,e.g., calcium carbonate, calcium phosphate and kaolin. The injectable compositions are formulated as known in the art and may contain appropriate dispersing or wetting agents and suspending agents identical or similar to those mentioned above. These pharmaceutical preparations may contain up to about 9o percent of the active ingredient in combination with the carrier or adjuvant.

The anti-depressant effective dosage of active ingredient employed for the treatment of depression may vary depending on the particular compound employed and the severity of the condition being treated. However, in general, satisfactory results are obtained when the compounds are administered at a daily dosage of from about 0.07 milligram to about 50 milligrams per kilogram of animal body weight p.o. For most large mammals in need of said treatment, the total daily dosage if from about 5 to about 400 milligrams. Dosage forms suitable for internal use comprise from about 10 to about 25 milligrams of the active compound in intimate admixture with a solid or liquid pharmaceutically acceptable carrier or diluent. The preferred pharmaceutical compositions from the standpoint of preparation and ease of administration are solid compositions, particularly hard-filled capsules and tablets containing about 10 to 25 milligrams of active ingredient.

EXAMPLE 12.8 g. of 2-Nitro-10.11-dihydro-11-oxo-dibenz[b,f][1,4] oxazepine (m.p. 360°C) and 5 ml of N,N-dimethylaniline are heated in 150 ml of phosphorus oxychloride at reflux for 4 hours. The reaction mixture is then evaporated in vacuo to remove the excess phosphorus oxychloride and the residue is decomposed with ice/water and shaken out immediately with xylene. The xylene phase is washed with dilute hydrochloric acid and water, dried over sodium sulphate, filtered through aluminium oxide and concentrated in vacuo to a volume of 70 ml. The reaction mixture so obtained is added during 2 hours dropwise to a boiling solution of 86.1 g of anhydrous piperazine in 800 ml of xylene and 50 ml of dioxane and heated at reflux for 4 hours. The reaction mixture is poured onto ice/water and rendered alkaline with concentrated soda lye. The xylene phase is washed with water and extracted with 2 N sulphuric acid. The sulphuric acid extracts are washed with toluene and rendered alkaline with concentrated soda lye and the base which separates is extracted with methylene chloride. The organic phase is washed with water, dried over sodium sulphate, filtered through aluminium oxide and evaporated to dryness in vacuo. The residue is crystallized from acetone/petroleum ether and gives 12 g of 2-nitro-11-(1-piperazinyl)-dibenz[b,f][1,4] oxazepine of m.p. 190°–192°C.

PRODUCTION OF TABLETS

For the manufacture of tablets, the products of this invention can be mixed with lactose and granulated with water, 0.5 percent sodium alginate or 1 percent gelative solution. The dried granulate is compressed into tablets in the presence of about 5 percent of talcum, 5 percent of corn starch and 0.1% of magnesium stearate. In this way, there are obtained, e.g. tablets of the following composition:

| | |
|---|---|
| 2-Nitro-11-(1-piperazinyl)-dibenz[b,f][1,4]-oxazepine | 20 mg |
| Lactose | 120 mg |
| Corn starch | 7.5 mg |
| Talcum | 7.5 mg |
| Magnesium stearate | 0.15 mg |

These 155 mg tablets, which are provided with a crackline, can be administered orally in the dosage of ½ to 2 tablets 2 to 5 times, in some cases up to 5 times 4 tablets per day in the treatment of subjects suffering from states of mental depression and especially agitated forms of depression.

STERILE SUSPENSION FOR INJECTION AND ORAL LIQUID SUSPENSION

The following pharmaceutical compositions are formulated with the indicated amount of active agent using conventional techniques. The injectable suspension and the oral liquid suspension represent formulations useful as unit doses and may be administered in the treatment of depression. The injectable suspension is suitable for administration once a day whereas the oral liquid suspension is suitable administered 2 to 4 times per day for this purpose.

| Ingredients | Weight (mg) sterile injectable suspension | oral liquid suspension |
|---|---|---|
| 2-nitro-11-(1-piperizinyl)-dibenz[b,f][1,4] oxazepine | 20 | 20 |
| sodium carboxy methyl cellulose U.S.P. | 1.25 | 12.5 |
| methyl cellulose | 0.4 | — |
| polyvinylpyrrolidone | 5 | — |
| lecithin | 3 | — |
| benzyl alcohol | 0.01 | — |
| magnesium aluminum silicate | — | 47.5 |
| flavor | — | q.s. |
| color | — | q.s |
| methyl paraben, U.S.P. | — | 4.5 |
| propyl paraben, U.S.P. | — | 1.0 |
| polysorbate 80 (e.g. Tween 80), USP | — | 5 |
| sorbital solution, 70%, U.S.P. | — | 2,500 |
| buffer agent to adjust pH for desired stability | q.s. | q.s. |
| water | for injection q.s. to 1 ml. | q.s. to 5 ml. |

CAPSULES SUITABLE FOR ORAL ADMINISTRATION

Capsules containing the ingredients indicated below may be prepared by conventional techniques and are useful in treating depression at a dose of one tablet of capsule 2 to 4 times a day.

| Ingredient | Weight (mg) Capsule |
|---|---|
| 2-nitro-11-(piperizinyl)-dibenz[b,f][1,4] oxazepine | 10 |
| lactose | 290 |
| Total | 300 mg |

What is claimed is:

1. A method for treating depression, which comprises enterally or parenterally administering to a mammal in need of said treatment an anti-depressant effective amount of 4-nitro-11-(1-piperazinyl)-dibenz [b,f][1,4]oxazepine or a pharmaceutically acceptable acid addition salt thereof.

2. A method according to claim 1 wherein 2-nitro-11-(1-piperazinyl)-dibenz [b,f][1,4] oxazepine or a pharmaceutically acceptable acid addition salt thereof is administered to a mammal in need of said treatment at a daily dose of from about 5 milligrams to about 400 milligrams.

3. A method according to claim 1 wherein 2-nitro-11-(1-piperazinyl)-dibenz [b,f] [1,4] oxazepine or a pharmaceutically acceptable acid addition salt thereof is administered to a mammal in need of said treatment in a unit dosage form comprising said 2-nitro-11-(1-piperazinyl)-dibenz [b,f] [1,4] oxazepine or a pharmaceutically acceptable acid addition salt thereof to the extent of from about 10 milligrams to about 25 milligrams per unit dosage.

* * * * *